(12) United States Patent
Chen

(10) Patent No.: US 7,643,280 B2
(45) Date of Patent: Jan. 5, 2010

(54) ASSEMBLING STRUCTURE FOR ELECTRONIC MODULE

(75) Inventor: Chiang-Ko Chen, Taipei (TW)

(73) Assignee: First International Computer, Inc., Taipei (TW)

( * ) Notice: Subject to any disclaimer, the term of this patent is extended or adjusted under 35 U.S.C. 154(b) by 163 days.

(21) Appl. No.: 11/775,387

(22) Filed: Jul. 10, 2007

(65) Prior Publication Data

US 2009/0016007 A1    Jan. 15, 2009

(51) Int. Cl.
G06F 1/16 (2006.01)

(52) U.S. Cl. .................................... 361/679.33

(58) Field of Classification Search ................. 361/685, 361/679.33–679.36
See application file for complete search history.

(56) References Cited

U.S. PATENT DOCUMENTS

| | | | | |
|---|---|---|---|---|
| 5,745,342 A * | 4/1998 | Jeffries et al. | ............... | 361/683 |
| 5,995,364 A * | 11/1999 | McAnally et al. | ........... | 361/685 |
| 6,215,664 B1 * | 4/2001 | Hernandez et al. | .......... | 361/725 |
| 6,299,266 B1 * | 10/2001 | Justice et al. | ............ | 312/223.2 |
| 6,318,823 B1 * | 11/2001 | Liao | ........................ | 312/223.2 |
| 6,473,313 B1 * | 10/2002 | Chen et al. | .................. | 361/801 |
| 6,529,373 B1 * | 3/2003 | Liao et al. | .................... | 361/685 |
| 6,728,109 B1 * | 4/2004 | Wu | ............................. | 361/747 |
| 6,754,071 B2 * | 6/2004 | Lin et al. | ..................... | 361/685 |
| 6,757,164 B2 | 6/2004 | Lin et al. | | |
| 6,879,484 B2 * | 4/2005 | Chou | .......................... | 361/683 |
| 6,882,527 B2 * | 4/2005 | Wang et al. | .................. | 361/685 |
| 6,935,604 B2 * | 8/2005 | Chen | .......................... | 248/694 |
| 6,956,737 B2 * | 10/2005 | Chen et al. | .................. | 361/685 |
| 7,031,149 B2 * | 4/2006 | Dean et al. | .................. | 361/685 |
| 7,038,907 B2 * | 5/2006 | Chen | .......................... | 361/685 |
| 7,046,517 B2 * | 5/2006 | Long et al. | ................... | 361/725 |
| 7,092,249 B2 * | 8/2006 | Wang | ..................... | 361/679.33 |
| 7,180,734 B2 * | 2/2007 | Jing | ............................. | 361/685 |
| 7,254,018 B2 * | 8/2007 | Zhang et al. | ................. | 361/685 |
| 7,257,827 B2 * | 8/2007 | Lee | ............................. | 720/653 |
| 7,262,960 B2 * | 8/2007 | Huang | ................... | 361/679.33 |
| 7,433,183 B2 * | 10/2008 | Huang | ................... | 361/679.33 |
| 7,469,978 B2 * | 12/2008 | Liang | ...................... | 312/223.2 |
| 7,502,224 B2 * | 3/2009 | Motoe | ................... | 361/679.33 |
| 2005/0068720 A1 * | 3/2005 | Lambert et al. | ............. | 361/685 |
| 2006/0061956 A1 * | 3/2006 | Chen et al. | .................. | 361/685 |
| 2006/0171109 A1 * | 8/2006 | Chang | ......................... | 361/685 |
| 2009/0147391 A1 * | 6/2009 | Kobayashi et al. | ........... | 360/55 |

* cited by examiner

Primary Examiner—Lisa Lea-Edmonds
(74) Attorney, Agent, or Firm—Rabin & Berdo, P.C.

(57) ABSTRACT

The assembling structure for electronic module comprise a case and a side frame, the characteristic is the case fixed on the base frame of the assembling structure by two front pivots and the case pivoted thereon. Besides, the side frame is installed adjacent to the case. In addition, the case and the side frame respectively include a plurality of locking holes, the side frame further including a locking controller with a first latch and a second latch corresponding to the locking holes, thereby locking the case at a horizontal and oblique position.

12 Claims, 5 Drawing Sheets

ASSEMBLING STRUCTURE FOR ELECTRONIC MODULE

FIELD OF THE INVENTION

Figure 1:
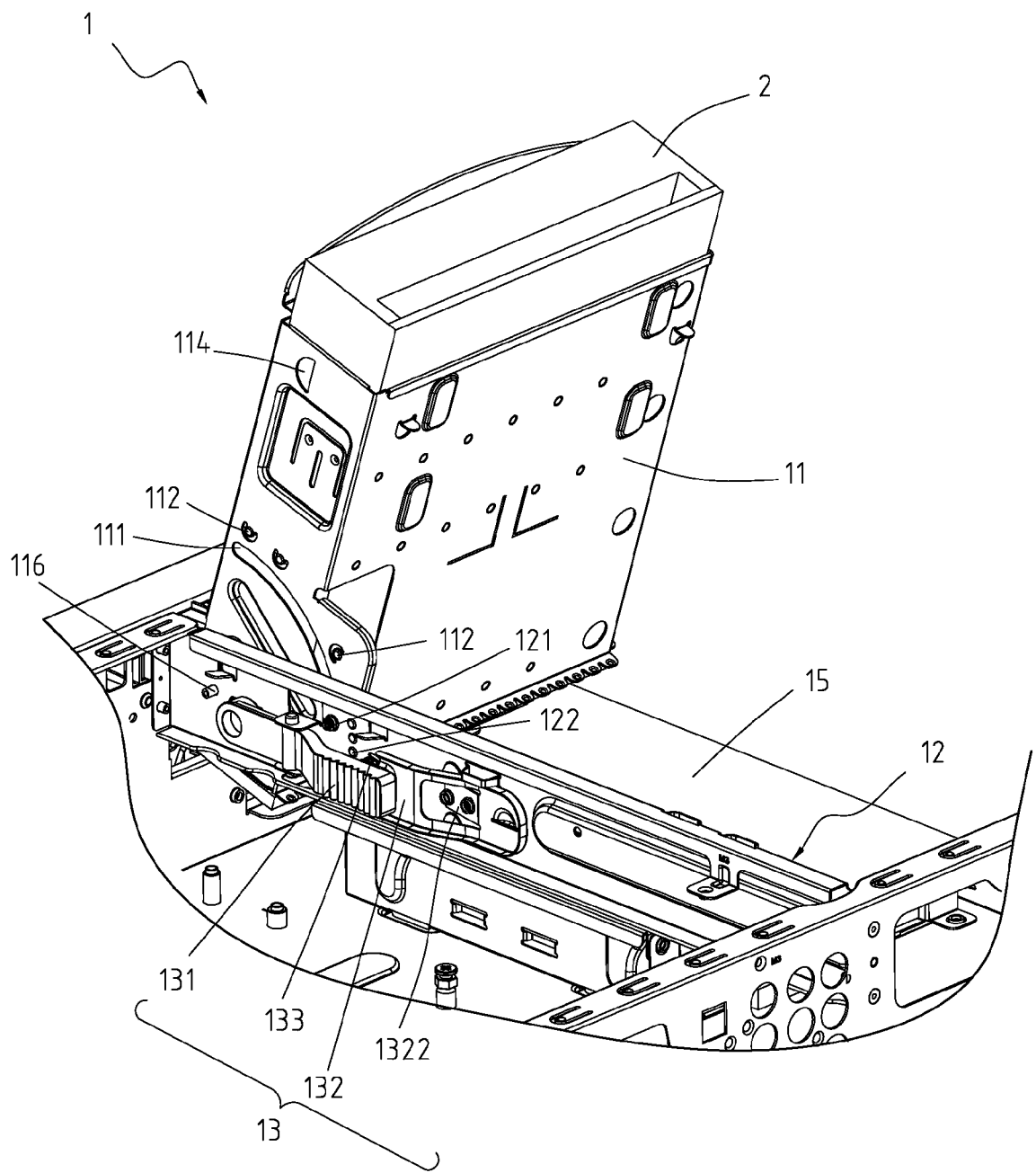

The present invention relates to an assembling structure, and more particularly, to an assembling structure for electronic module.

BACKGROUND OF THE INVENTION

With the increasing demands for IT products, the related technologies and products are developed on large scale. For examples, computer products and multimedia equipments are developed with rapid growth and progress. However, the peripheral device, such as an optical disk drive, hard disk drive or floppy disk drive, is usually installed in immoveable shelves in a metal housing. Besides, other related device, such as a power supply, disposed on the housing, also occupies some space. Thus, the space in the housing is very crowded.

Additionally, the housing and the shelves are made of metal materials and have keen edges and corners. Users' fingers may be slashed if the users stretched hands into the housing for assembly and repair. So it is very inconvenient and dangerous. Furthermore, the peripheral devices are upgraded and eliminated through competitions rapidly. In this situation, it is more and more frequent that users disassemble and assemble those devices by themselves. Consequently the assembling structure with immoveable shelves and crowded inner space in the housing is really inconvenient to users.

U.S. Pat. No. 6,757,164 B2 published on Jun. 29, 2004, titled "Positioning Unit for a Computer Housing-and-Peripheral Device Assembly". The positioning unit of the invention includes a positioning member disposed between the peripheral device and the computer housing, including a thin plate that is stamped to form a bent spring arm having a first section which extends toward the casing, and a second section which bends from the first section and which extends toward the computer housing. Conventionally, the peripheral device, such as an optical disk drive, a floppy disk drive or a hard disk drive, is mounted in the computer housing via screw means. As such, it is relatively inconvenient to mount or dismount the peripheral devices in the computer housing through tightening or loosening of the screw means. Although the invention is provided for mounting the peripheral devices in the computer housing without screw means, the inconvenience resulting from the space restriction and immoveable shelves is not overcame yet, and the problem is still exists.

SUMMARY OF THE INVENTION

According to the above drawbacks, the present invention provides an assembling structure for electronic module to improve the assembly inconvenience due to the space restriction.

The primary objective of the present invention is to provide an assembling structure for electronic module comprising a case and a side frame. The characteristic of the present invention is the case fixed on the base frame of the assembling structure by two front pivots and the case is pivoted thereon, the side frame is adjacent to the case. Furthermore, the case and the side frame include a plurality of locking holes respectively, wherein the locking holes of the case are corresponding to the locking holes of the side frame. Additionally, the side frame further includes a locking controller with a first latch and a second latch, each corresponding to locking holes of the case and side frame, thereby locking the case at a horizontal and oblique position. By this way, it is more convenient to assemble electronic modules without space restrictions of prior art.

To achieve the objectives of the present invention, the assembling structure for electronic module is provided, wherein the case further includes a receiving space to contain the electronic module, and the case having a front opening and a rear opening, wherein the front opening is adapted to put in the electronic module therethrough, while the rear opening is utilized to insert the electric lines of the electronic module. In addition, the case further includes a guide track disposed on the side wall adjacent to the side frame, and the side frame further includes a pivot installed through the guide track. By the association of the pivot and track, the case can be rotated between the horizontal position and oblique position.

Furthermore, the case further includes a plurality of auxiliary positioning convex disposed on the side wall adjacent to the side frame, and the side frame also includes a plurality of auxiliary positioning concave set correspondingly to the auxiliary positioning convexs. By means of the convexs and concaves, the case is assisted to be positioned multistagely between the horizontal and oblique position. Therefore, the auxiliary positioning function is provided to keep the case away from rotating randomly and clapping suddenly to avoid dangers. Moreover, the auxiliary positioning convexs and concaves are on the sites that are corresponding and exchangeable mutually, that is to say, the auxiliary positioning convexs could be set on the case and the auxiliary positioning concaves could be set on the side frame, alternatively, the auxiliary positioning convexs could be set on the side frame and the auxiliary positioning concaves could be set on the case. In brief, the auxiliary positioning convexs and concaves are matched mutually to provide the auxiliary positioning function to prevent dangers no matter which form is adopted.

Moreover, the locking controller of the present invention includes a first latch and a second latch, wherein the second latch is a metal material with ductility and elasticity, and the second latch further including an elastic fixing piece mounted on the outer side of the side frame to have the front end of the second latch disposed at the inner side of the first latch and contacted with the rear end of the first latch. Additionally, the first latch further includes a locking means disposed on the front end, and the second latch further includes a locking means on the rear end, respectively, to lodge in the corresponding locking holes. Besides, the locking controller further includes a spring disposed between the first latch and the side frame.

As above, locking means of the first latch and the second latch are respectively corresponding to their locking holes to lock the case at a horizontal and oblique position. In addition, the locking holes of the case are the first, second and third locking hole, disposed on the side wall of the case adjacent to the side frame. Besides, the locking holes of the side frame are the fourth and fifth locking hole. Accordingly, the fourth locking hole is corresponding to the first and second locking hole, while the fifth locking hole corresponding to the third locking hole. To have the case locked at the horizontal position, the locking means of the first latch is lodged in the first and fourth locking holes, and the locking means of the second latch is lodged in the third and fifth locking holes. Alternatively, to have the case locked at the oblique position, the locking means of the first latch is needed to be lodged in the second and fourth locking holes only.

Additionally, the locking means of the first latch, the first, second and fourth locking holes are oval-shaped, while the locking means of the second latch, the third and fifth locking holes are semicircle-shaped, wherein the locking means of the second latch is a semicircle sphere with unidirectional lodging function. Consequently, the locking means can be lodged in the locking holes to lock the case by means of the shape coincidences.

BRIEF DESCRIPTIONS OF THE DRAWINGS

Figure 2:
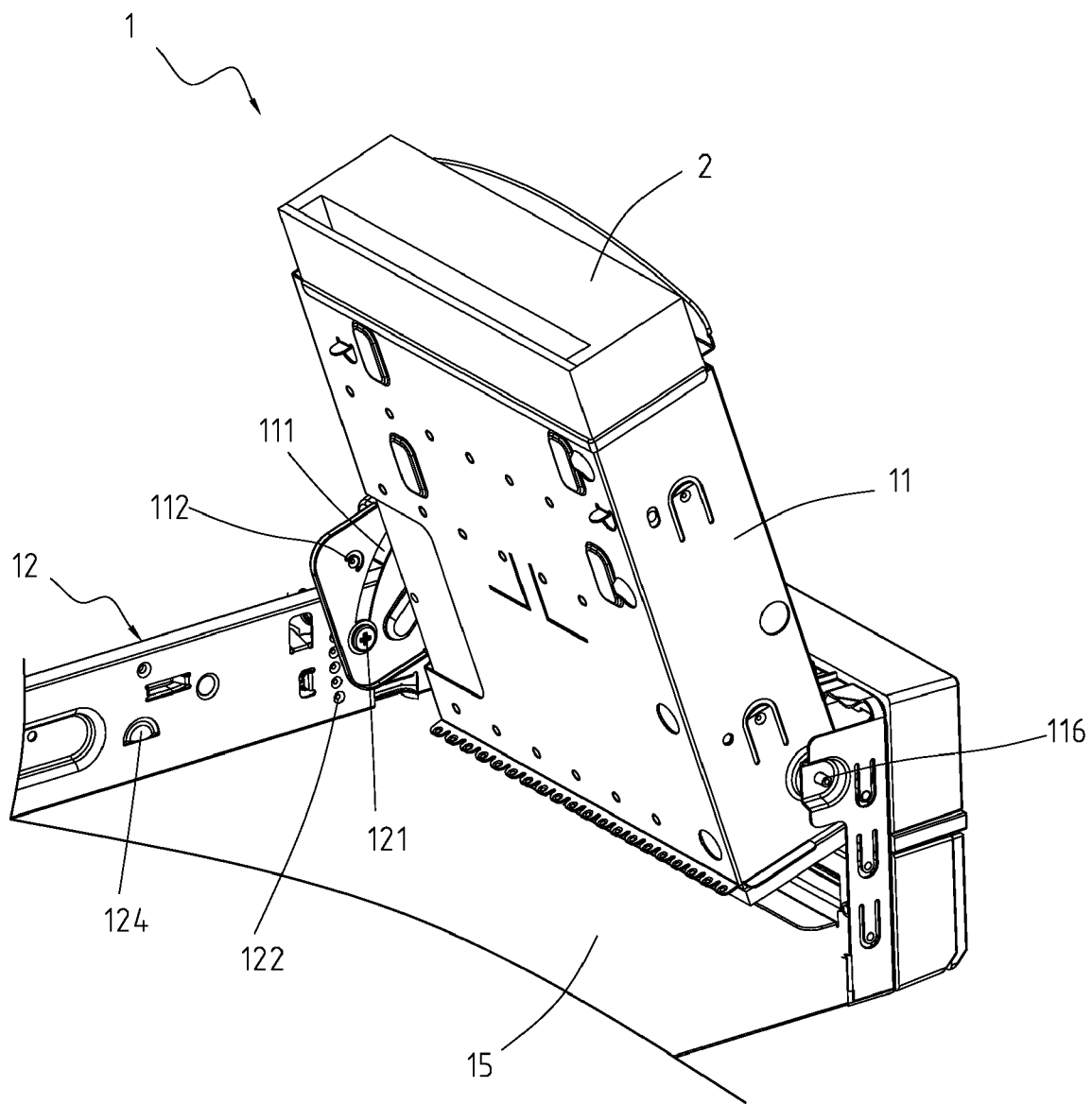
Figure 3:
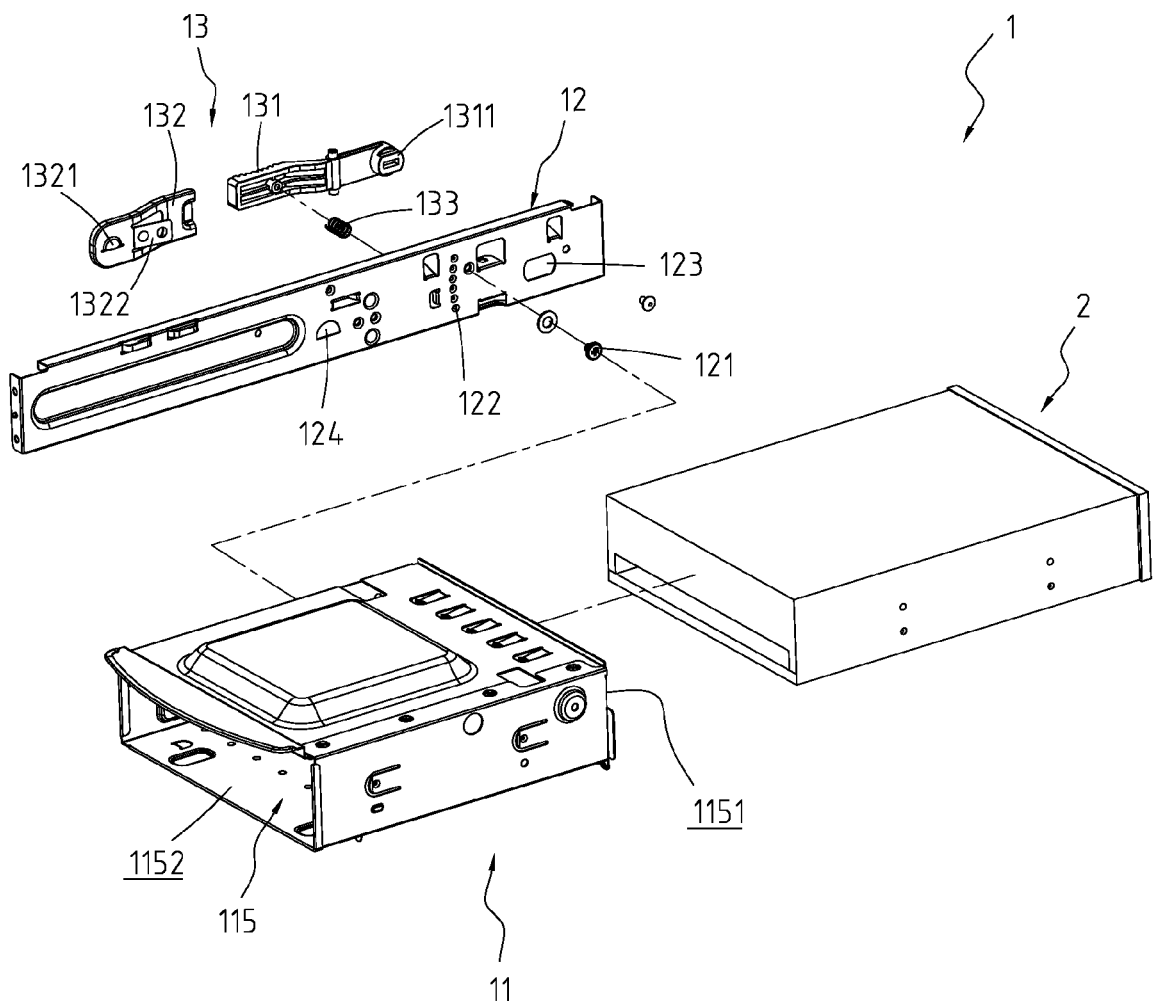
Figure 4A:
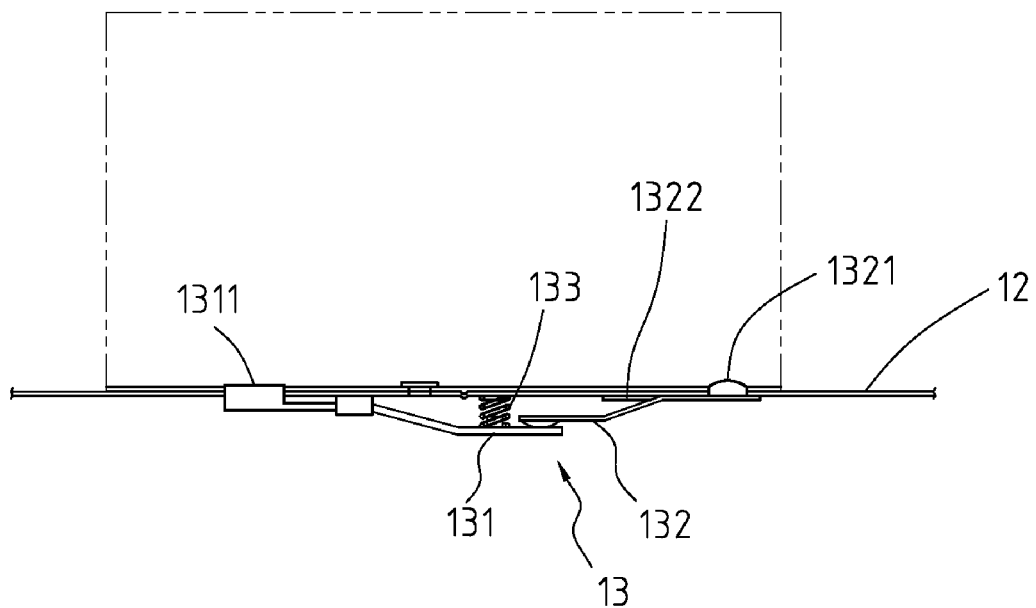
Figure 4B:
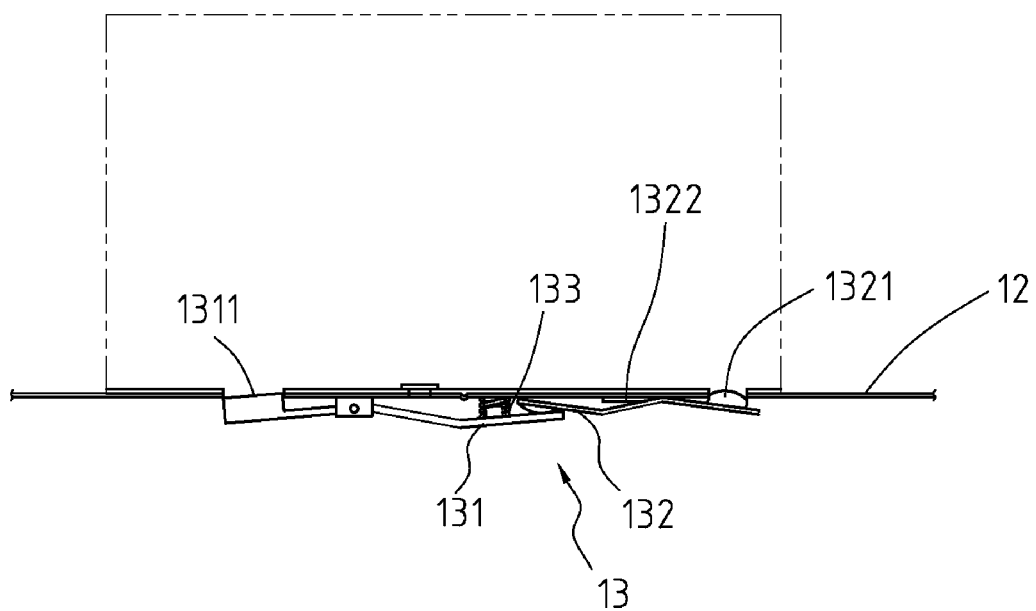
Figure 5A:
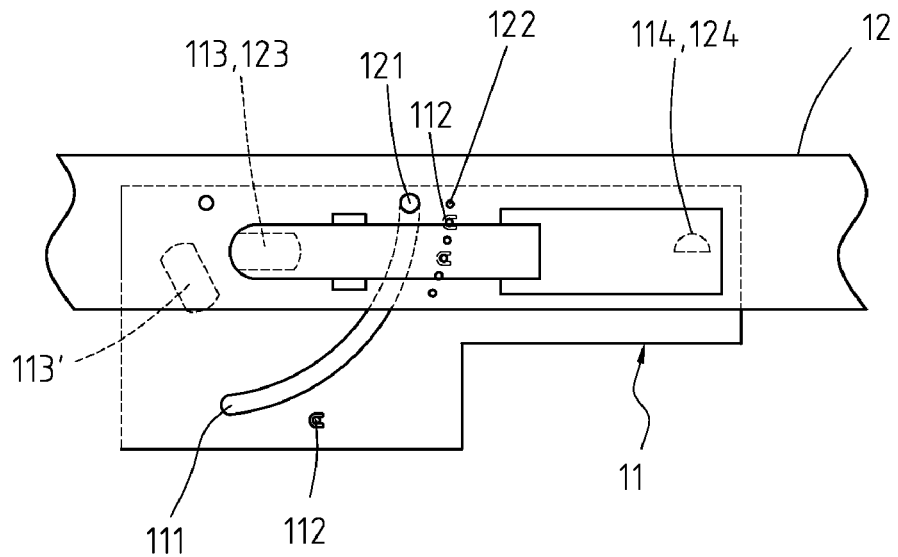
Figure 5B:
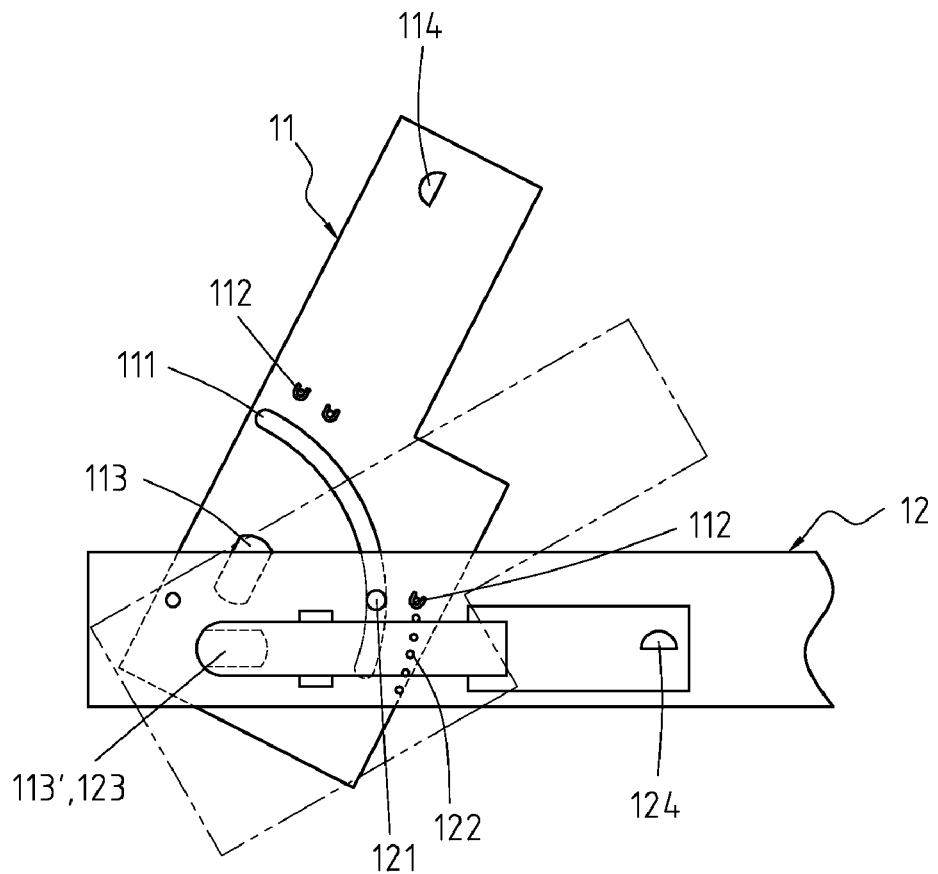

The foregoing aspects, as well as many of the attendant advantages and features of this invention will become more apparent by reference to the following detailed description, when taken in conjunction with the accompanying drawings, wherein:

FIG. 1 illustrates the left view of the present invention;
FIG. 2 illustrates the right view of the present invention;
FIG. 3 illustrates the exploded view of the present invention;
FIGS. 4a and 4b illustrate the motions of locking controller of the present invention; and
FIGS. 5a and 5b illustrate the horizontal and oblique positions of the case of the present invention.

DETAILED DESCRIPTIONS OF THE PREFERRED EMBODIMENT

Referring to FIG. 1, FIG. 3, FIGS. 5a and 5b to illustrate the left view, the exploded view, and the horizontal and oblique positions of the case of the present invention, respectively. The assembling structure for electronic module 1 comprises a case 11 and a side frame 12 and the characteristic is that the case 11 fixed on the base frame 15 of the assembling structure 1 by two front pivots 116 and the case 11 pivoted thereon. In addition, the side frame 12 is disposed adjacent to the case 11. Furthermore, the case 11 and the side frame 12 include a plurality of locking hole respectively, wherein the locking holes of the case 11 are corresponding to the locking holes of the side frame 12. In the preferred embodiment, the locking holes are the first locking hole 113, the second locking hole 113', the third locking hole 114, the fourth locking hole 123, and the fifth locking hole 124. Besides, the side frame 12 has a locking controller 13 thereon, with a first latch 131 and a second latch 132, each latch corresponding to it's locking holes respectively, thereby locking the case 11 at a horizontal and oblique position.

Moreover, the side frame 12 is parallel with the case 11 while the case 11 is at the horizontal position. Besides, the locking controller 13 of the present invention includes the first latch 131 and the second latch 132, wherein the second latch 132 is a metal material with ductility and elasticity, and further including an elastic fixing piece 1322 mounted on the outer side of the side frame 12, to have the front end of the second latch 132 disposed at the inner side of the first latch 131, and the front end of second latch 132 is contacted with the rear end of the first latch 131. Therefore, the second latch 132 is acted after the first latch 131 is pressed.

Subsequently, with reference to FIG. 1, FIG. 2, and FIG. 3 showing the left view, the right view, and the exploded view of the present invention, respectively. The case 11 of the assembling structure for electronic module 1 further includes a receiving space 115 to contain the electronic module 2 such as an optical disk drive, hard disk drive or floppy disk drive. The case 11 includes two openings, a front opening 1151 and a rear opening 1152. The front opening 1151 is adapted for insertion of the electronic module 2 therethrough into the receiving space 115 when the case 11 is at the horizontal position. After the electronic module 2 is put in the receiving space 115 and fixed by screws, the case 11 with the electronic module 2 inside is rotated to the oblique position. At this position, the rear opening 1152 is utilized to insert the electric lines of the electronic module 2. In addition, guide track 111 is disposed on the side wall of the case 11 adjacent to the side frame 12, and the side frame 12 further includes a pivot (hinge) 121. In this embodiment, the pivot 121 is coupled to the side frame 12 and further installed through the guide track 111. By the association of the pivot 121 and guide track 111, the case 11 can be rotated between the horizontal position and oblique position.

However, it is possible to hurt fingers due to the case 11 clapping suddenly if the case 11 is rotated randomly without any resistance. Therefore, the present invention provides the auxiliary positioning function to have the case 11 positioned multistagely between the horizontal and oblique positions when rotated. The case 11 further includes a plurality of auxiliary positioning convex (detents) 112 which are disposed on the side wall adjacent to the side frame 12. Furthermore, the side frame 12 further includes a plurality of auxiliary positioning concave (protrusions) 122 corresponding to the auxiliary positioning convexs 112. The distribution of the auxiliary positioning convexs 112 and auxiliary positioning concaves 122 is parallel with the guide track 111, in other words, the distribution of the auxiliary positioning convexs 112 and auxiliary positioning concaves 122 is in accordance with the pathway that is followed by the case 11 while the case 11 rotated. Thus, the auxiliary positioning convexs 112 are lodged in the auxiliary positioning concaves 122 orderly when the case 11 is rotated between the horizontal and oblique positions. By means of the auxiliary positioning convexs and concaves, the case 11 is assisted to be positioned multistagely between the horizontal and oblique positions. Therefore, the auxiliary positioning function is provided to keep the case 11 away from rotating randomly and clapping suddenly to avoid dangers.

Moreover, the auxiliary positioning convexs 112 and concaves 122 are on the sites that are corresponding and exchangeable mutually, that is to say, the auxiliary positioning convexs 112 could be set on the case 11 and the auxiliary positioning concaves 122 could be set on the side frame 12, alternatively, the auxiliary positioning convexs 112 could be set on the side frame 12 and the auxiliary positioning concaves 122 could be set on the case 11. In brief, the auxiliary positioning convexs 112 and concaves 122 are matched mutually to provide the auxiliary positioning function to prevent dangers no matter which form is adopted. In the preferred embodiment, the auxiliary positioning convexs 112 are set on the case 11 and the auxiliary positioning concaves 122 are set on the side frame 12.

With reference to FIGS. 4a and 4b illustrating the motions of locking controller of the present invention. The locking controller 13 of the assembling structure for electronic module 1 includes the first latch 131 and the second latch 132, wherein the second latch 132 is a metal material with ductility and elasticity, and second latch 132 further including an elastic fixing piece 1322 mounted on the outer side of the side frame 12 to have the front end of the second latch 132 disposed at the inner side of the first latch 131, and the front end of the second latch 132 is contacted with the rear end of the first latch 131. Moreover, a locking means 1311 is disposed on the front end of the first latch 131, while the other locking means 1321 is disposed on the rear end of the second latch 132. The locking controller 13 further includes a spring 133 disposed between the first latch 131 and the side frame 12. On the one hand, the second latch 132 and the spring 133 are pressed as the first latch 131 is forced, at the same time, the locking means 1311, 1321 are raised to leave their original positions. On the other hand, the first latch 131, the second latch 132 and the locking means 1311, 1321 are returned to their original positions by the spring force of the second latch 132 and the spring 133 as the first latch 131 is released.

Furthermore, referring to FIGS. 5a and 5b to illustrate the horizontal and oblique positions of the case of the present invention. As illustrated in FIG. 5a, the case 11 includes the first locking hole 113, the second locking hole 113' and the third locking hole 114, all of which are disposed on the side wall adjacent to the side frame 12. Besides, the side frame 12 includes the fourth locking hole 123 and the fifth locking hole 124. Accordingly, the fourth locking hole 123 is corresponding to the first and second locking hole 113, 113', while the fifth locking hole 124 corresponding to the third locking hole 114.

Please refer to FIG. 4a and FIG. 5a, the first hole 113 is overlapped with the fourth hole 123, and the third locking hole 114 is overlapped with the fifth locking hole 124, when the case 11 is at the horizontal position. At the same time, the locking means 1311 is lodged in the first and fourth locking hole 113, 123, and the locking means 1321 is also lodged in the third and fifth locking hole 114, 124. Thus, the case 11 is locked at the horizontal position.

Subsequently, please refer to FIG. 4b and FIG. 5b. To assemble the electronic module 2, the electronic module 2 is inserted through the front opening 1151 into the receiving space 115 of the case 11 and fixed by screws, then the rear end of the first latch 131 is forced, and the front end of the second latch 132 and the spring 133 are moved downward subsequently. At the same time, the locking means 1311 is left the first and fourth locking hole 113, 123, and the locking means 1321 is also left the third and fifth locking holes 114, 124. Afterward, the case 11 can be rotated upward to the oblique position. In the meanwhile, the second locking hole 113' and the fourth locking hole 123 are overlapped, and the locking means 1311 is immediately lodged in the second and fourth locking hole 113', 123 to lock the case 11 at the oblique position. Consequently, it is convenient to assemble the electric lines of the electronic module 2. Besides, circuit boards and other electronic devices are usually installed under the case 11, and the movable case 11 of the present invention is able to overcome the space restriction against maintaining and repairing.

As illustrated in FIG. 4b, the first latch 131 is forced to have the locking means 1311 left the second and fourth locking hole 113', 123, and then the rear end of the case 11 is pushed downward to have the case 11 return to the horizontal position. In the meanwhile, please refer to FIG. 4a and FIG. 5a, the first and fourth locking hole 113, 123 are overlapped again, and the third and fifth locking hole 114, 124 are overlapped as well. Subsequently, the locking means 1311 is lodged in the first and fourth locking hole 113, 123, and the locking means 1321 is lodged in the third and fifth locking hole 114, 124. Therefore, the case 11 is locked at the horizontal position again. In addition, the locking means 1321, the third locking hole 114 and fifth locking hole 124 are semicircle-shaped, wherein the locking means 1321 is further a semicircle sphere. When the case 11 is pushed downward from the oblique position, it is necessary to force the rear end of the first latch 131 to release the case 11 from locked. Because the locking means 1321 is a semicircle sphere with smooth surface, it is able to be pushed by the edge of the case 11 while the case 11 rotated. As soon as the case 11 is returned to the horizontal position, the third locking hole 114 and the fifth locking hole 124 are overlapped, and the locking means 1321 is automatically lodged in the third and fifth locking hole 114, 124 immediately. So the locking means 1321 is provided with the unidirectional lodging function.

While the invention has been particularly shown and described with reference to the preferred embodiments thereof, these are, of course, merely examples to help clarify the invention and are not intended to limit the invention. It will be understood by those skilled in the art that various changes, modifications, and alterations in form and details may be made therein without departing from the spirit and scope of the invention, as set forth in the following claims.

What is claimed is:

1. An assembling structure for an electronic module, comprising:
   a side frame mounted on a base frame, the side frame having a plurality of locking holes;
   a case pivotally connected to the side frame, and being rotatable to multistage positions between a horizontal and an oblique position, the case having a plurality of locking holes; and
   a locking controller disposed on the side frame, which locks and holds the case by engaging with corresponding ones of the locking holes of the frame and the case, and comprising
   a first latch; and
   a second latch formed of a metal material having ductility and elasticity characteristics, and including an elastic fixing piece mounted on an outer side of the side frame, a front end of the second latch being disposed at an inner side of the first latch and contacting a rear end of the first latch.

2. The assembling structure for an electronic module as claimed in claim 1, wherein the case further comprises a receiving space to contain the electronic module.

3. The assembling structure for an electronic module as claimed in claim 2, wherein the electronic module is one of an optical disk drive, a hard disk drive and a floppy disk drive.

4. The assembling structure for an electronic module as claimed in claim 1, wherein the case further comprises a guide track adjacent to the side frame and being formed in a side wall of the case; wherein the side frame further comprises a hinge mounted thereon and protruding out through the guide track.

5. The assembling structure for an electronic module as claimed in claim 1, wherein the case further comprises a plurality of detents, and the side frame further comprises a plurality of protrusions, the protrusions being receivable within a respective detent.

6. The assembling structure for an electronic module as claimed in claim 5, wherein the detents and protrusions are mutually exchangeable.

7. The assembling structure for an electronic module as claimed in claim 1, wherein the locking holes of the case comprise a first, second and third locking hole mounted on a side wall of the case.

8. The assembling structure for an electronic module as claimed in claim 1, wherein the locking holes of the side frame comprise at least two locking holes.

9. The assembling structure for an electronic module as claimed in claim 1, wherein the first latch further comprises a first locking block mounted on a front end thereof, the first locking block being lodged in a corresponding locking hole.

10. The assembling structure for an electronic module as claimed in claim 1, wherein the second latch further comprises a second locking block mounted on a rear end thereof.

11. The assembling structure for electronic module as claimed in claim 10, wherein the second locking block is a semi sphere protruding toward the corresponding locking holes with an unidirectional lodging function.

12. The assembling structure for an electronic module as claimed in claim 1, wherein the locking controller further comprises a spring mounted between the first latch and the side frame and providing resilience to the first latch and the second latch.

* * * * *